4 Sheets—Sheet 1.

P. P. STEWART.

Cooking Stove.

No. 3,027. Reissued July 7, 1868.

Front Elevation

Side View

Witnesses
Charles D. Kellum
R. D. Reille

Inventor
Philo P. Stewart

N. PERKINS Photo Lithographer Washington, D. C.

P. P. STEWART.
Cooking Stove.
No. 3,027.
Reissued July. 7, 1868.
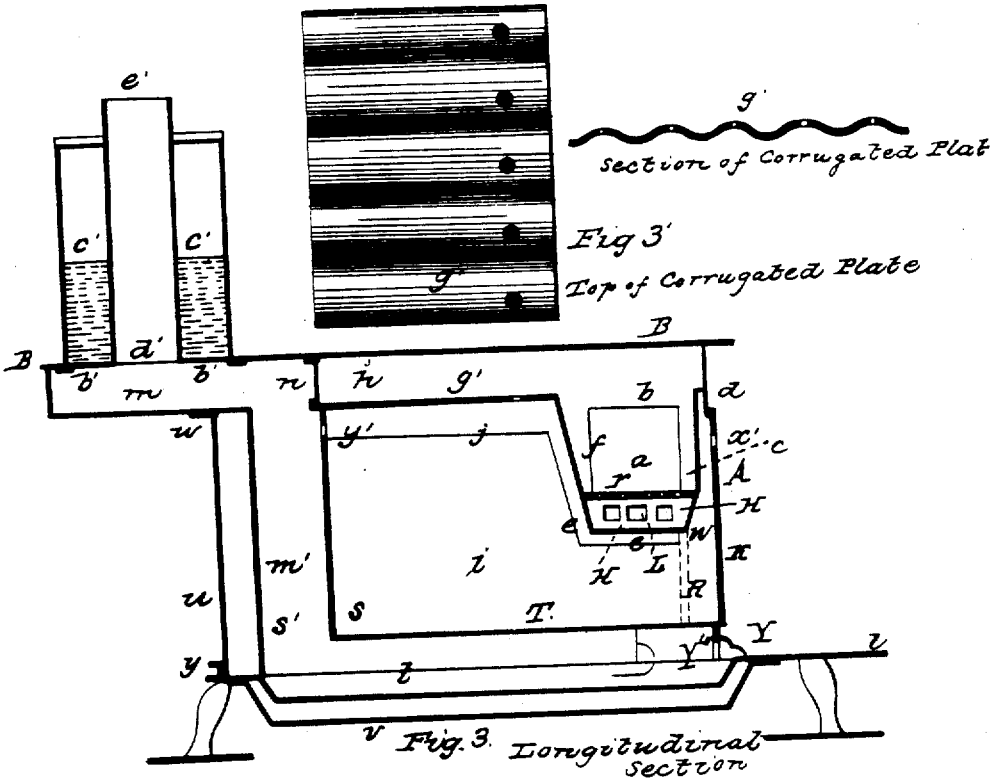
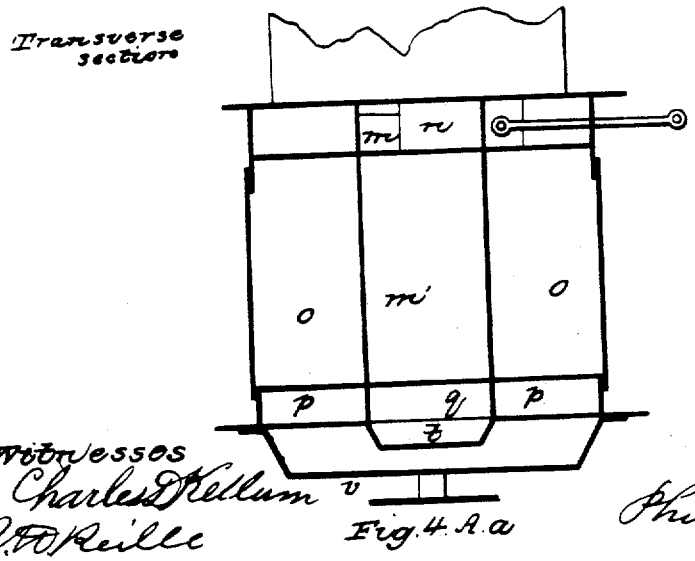
Witnesses
Charles D. Kellum
R. F. Reille
Inventor
Philo P. Stewart
N. PETERS Photo-Lithographer, Washington, D. C.

4 Sheets—Sheet 3.
P. P. STEWART.
Cooking Stove.
No. 3,027. Reissued July. 7, 1868.
Fig. 5. B. b
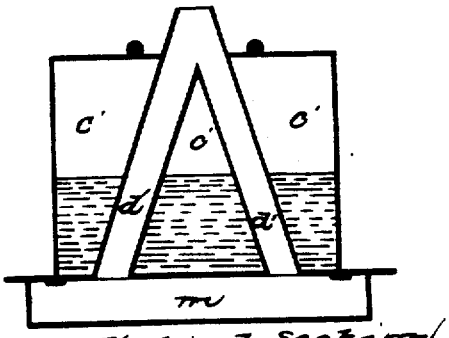
Vertical Section
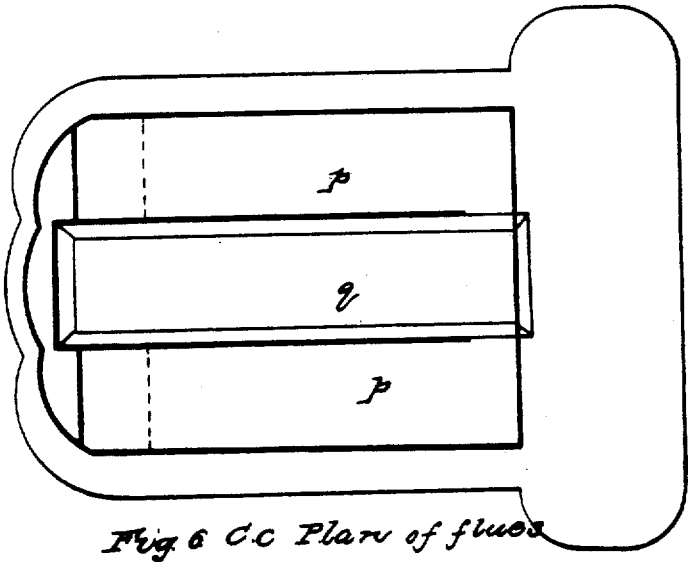
Fig. 6 C.C Plan of flues
Witnesses:
Charles D. Kellum
R. D. Reille
Inventor
Phil P. Stewart
N. PETERS, Photo-Lithographer, Washington, D. C.

4 Sheets—Sheet 4.

P. P. STEWART.

Cooking Stove.

No. 3,027. Reissued July. 7, 1868.

Witnesses
Charles Tellum
R. D. Rulle

Inventor
Phils P. Stewart

N. PETERS, Photo-Lithographer, Washington, D. C.

PATENT OFFICE

United States Patent Office.

PHILO P. STEWART, OF TROY, NEW YORK.

*Letters Patent No.* 22,681, *dated January* 18, 1859; *reissue No.* 1,684, *dated May* 31, 1864; *re-reissue No.* 3,027, *dated July* 7, 1868.

COOKING-STOVE.

The Schedule referred to in these Letters Patent and making part of the same.

TO ALL WHOM IT MAY CONCERN:

Be it known that I, PHILO P. STEWART, of the city of Troy, county of Rensselaer, and State of New York, did, on the 18th day of January, A. D. 1859, obtain of and from the United States of America, certain Letters Patent for and upon "new and useful Improvements in Cooking-Stoves," which said Letters Patent were duly surrendered, and thereafter duly reissued as provided by the law, bearing date the 31st day of May, 1864, and which said reissued Letters Patent have been found to be defective, in that they do not cover and embrace, in the claims and specifications thereof, all of the original invention and improvements contained in the drawings first and originally filed in the United States Patent Office, to wit, on the 17th day of August, 1855, which application, after being once rejected, was duly withdrawn, and a new application upon the same invention and improvements was duly filed, as by law made and provided, to wit, on the 20th day of October, 1858, each of which were in due form of law, but neither of which contained, in the specifications and claims thereof, the entire invention and improvements contained in the drawings originally made and filed in said Patent Office, as aforesaid; and being now desirous to reissue the Letters Patent herewith surrendered, in the manner and form as stated in the accompanying petition, in two separate divisions, with a separate patent upon each division, I prepared specifications and drawings of my said original invention and improvements; now, therefore, I do hereby declare that the following specification is a full, clear, exact, and more full description of that part of my said invention and improvements mentioned and contained in the claims hereto annexed, as well as of the construction, arrangement, and operation of the same, reference being had to the accompanying drawings, and to the letters of reference marked thereon, as a part thereof.

Like letters represent and refer to like or corresponding parts.

Figure 3 is a longitudinal vertical section, showing the different parts hereinafter described and set forth.

Figure 1:
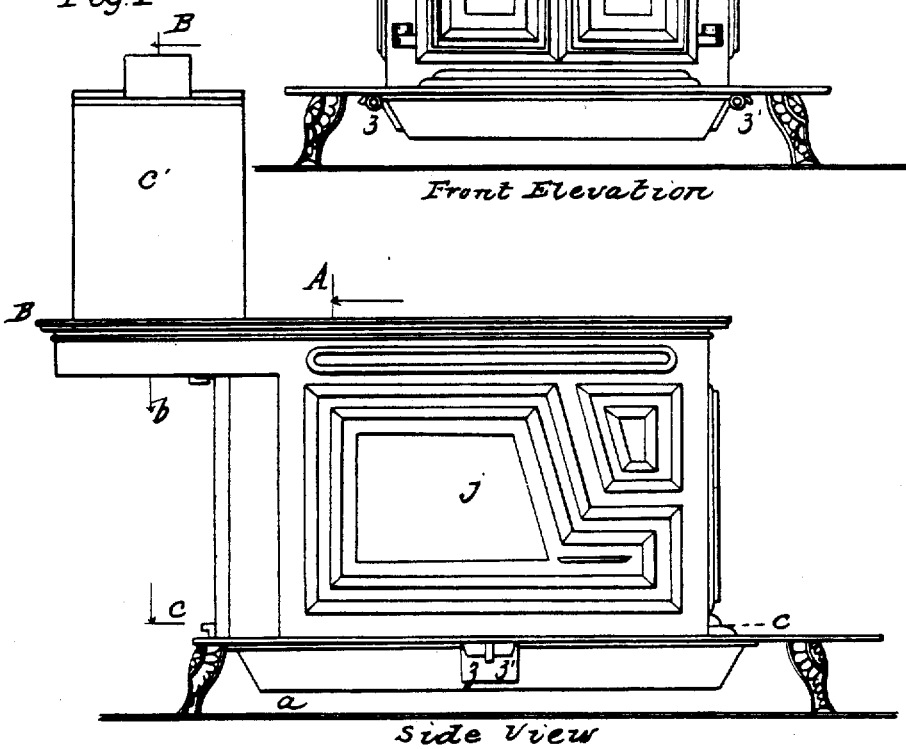
Figure 1 is a side elevation of a cooking-stove containing my invention and improvements herein and hereby set forth.

Figures 4, 5, and 6 are sections taken on and at the lines A *a*, B *b*, and C *c* of fig. 1 of the accompanying drawings.

Figure 7:
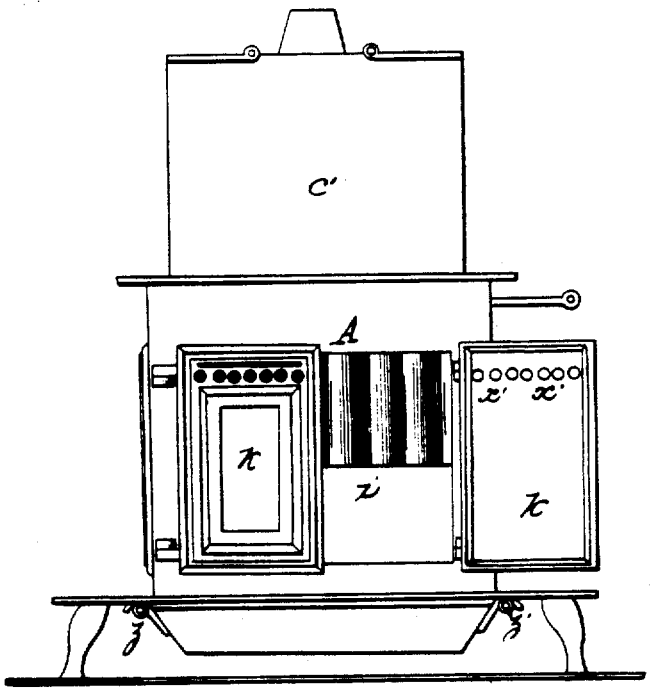

Figure 7 is a front elevation, showing the front of the fire-box or chamber of combustion, and the hot-air chamber or heating-flue between the front plate of such fire-box or combustion-chamber and the front doors, opening in the manner substantially as hereinafter described and set forth, and communicating with the oven, substantially as and for the purposes herein described and set forth in detail and at large.

Figure 8:
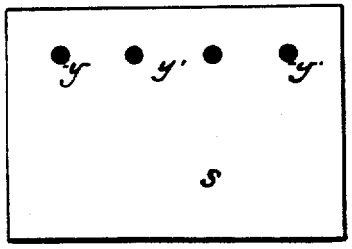

Figure 8 shows the plate in the rear or back of the oven, and immediately between the oven and the vertical flue or flues in the immediate rear or back end of the cooking-stove, with openings or apertures therein of sufficient number and size as may be required to accomplish the purposes hereinafter described and set forth.

There are four sheets of drawings accompanying this division and specification, and they are respectively marked 1, 2, 3, and 4, sheets, &c.

The nature of my invention contained in this specification consists in supplying the oven of a cooking-stove with a continued and fresh current of warm or highly-heated air, which shall be so heated by its coming into contact with the front plate of the fire-box or chamber of combustion as it passes into the chamber or flue between the said plate and front doors, through the apertures in said front doors, and thence down said chamber or flue, and along and upon the said plate of said fire-box or chamber of combustion, and thence into the oven, whereby the operation of baking is much and greatly aided and facilitated, and thereafter passing out from said oven into the rear vertical end flue or flues, as the case may be, through the openings or apertures in the said rear plate of the oven, in a most perfect and satisfactory manner, substantially as hereinafter described and set forth.

It also consists in combining with a cooking-stove suitable doors in the front of the oven, extending outward to the front end of the stove, under, and just below, the fire-chamber and the ash-chamber, (necessarily used with said combustion-chamber,) and which shall be of sufficient capacity to receive an open, tin, kitchen, or other roaster, so that the heat radiated by all the plates, and the back, front, and bottom plates of the fire-chamber or box, into the oven, may thus and thereby be employed for roasting or baking in front of the oven, when combined with an end door, so that the draught may be controlled without the aid, and independent of, the front doors, substantially as herein described and set forth.

It also consists in the arrangement and employment of a suitable door or doors in the front of a cooking-stove, and which shall, in part or in whole, open into that part or portion of the oven which extends forward and under the fire-box or chamber of combustion, and other parts necessarily employed and used therewith, as well as open immediately in front of the plate forming the front part or portion of the fire-box or chamber of combustion, in the manner and for the purposes substantially as herein described and set forth.

It also consists in the employment and arrangement of bottom, and back or rear-end casings, or additional end and bottom casings, and arranged at a short distance from the real bottom-plate of the stove, while said end casing is arranged in substantially the same way or manner as to the distance from the vertical end-plate of the stove, and which are made of tin or other suitable material, and combined with the several flues underneath the bottom of the oven, and which are each for the purpose of preventing the escape of heat from that part or portion of the stove over which they are arranged, and to retain the same at such parts of the stove by the means of such casings, and such space or chambers between the same and the respective plates of the stove, without much reducing the degree of the heat while and during the passage of the same in the flue or flues down the back or rear end of the stove, and under and along the bottom of the oven, forward and backward, to the rear end, and up the same towards the exit-passage thereof, thus and thereby greatly facilitating the operation of baking by such economy and saving of the heat in its passage through such flue or flues, in the manner and by the means substantially as herein described and set forth.

It also consists in the arrangement of a fire-box or chamber of combustion, containing a fire-grate, and an ash-chamber underneath the same, and the whole suspended in the oven of a cooking-stove, with the front and lower part thereof extending forward and below the same, and in combination with the front doors, which open in the front of the front plate of such fire-box or chamber of combustion, and also opening into that part or portion of said oven under the said fire-chamber, fire-grate, and ash-chamber, so arranged and suspended, in the manner and for the purposes substantially as herein described and set forth.

It also consists in the employment and arrangement of a corrugated plate, for and forming the top part or portion of the oven of a cooking-stove, projecting upward and back of the fire-box or chamber of combustion, fire-grate, and ash-chamber, in the manner and for the purposes substantially as herein described and set forth.

It also consists in the employment and arrangement of a damper in the front of the oven, and within the hearth of a cooking-stove, and in combination with the flue or flues in the bottom and underneath the oven thereof, in the manner and for the purposes substantially as herein described and set forth.

It also consists in the arrangement of a damper within the flue or flues of a cooking-stove, (as the case may be,) so that the heat or escaping heated products of combustion, which arise from the burning or consumption of fuel in the fire-chamber or fire-box of a cooking-stove, may be reversed, or thrown from direct entrance into the chamber immediately below the reservoir or water-tank, and consequently from direct action upon such reservoir, until after such heat or heated escaping products of combustion shall have been circulated in and through other parts of such stove, and thereafter admitted to and into such chamber, underneath said reservoir, thus and thereby warming or heating the water therein, and heating it to a much greater degree when, by means of such damper, the said heat or escaping heated products of combustion be admitted directly to and into such chamber, below said reservoir, from the combustion-chamber, through suitable flues or flue, in the manner substantially as herein described and set forth.

In the accompanying drawings, *a* represents the fire-box or chamber of combustion in the front end of the cooking-stove, as well as in the front and upper corner of the oven *i*, and it extends entirely across said front end of the stove, and thus it remains suspended within that part of said oven, while the lower part of such oven extends forward and below said fire-chamber to or beyond the front plate thereof. The said fire-chamber contains a fire-grate, *r*, immediately below which there is situated an ash-chamber. The said fire-grate may be of that kind which will vibrate or shake in or upon a horizontal line or plane for the purpose of relieving the burning coal from ashes or other impediments, or the fire-grate may be so constructed as not only to vibrate and shake, but also to dump or revolve over and back for the purpose of removing ashes from the fuel in the fire-chamber or to relieve such fire-chamber of and from the contents thereof into the ash-chamber below, or into an ash-pan in the said ash-chamber, if deemed best, so to use such an ash-pan. I prefer, however, to use a fire-grate, which will not dump but which will shake and vibrate upon a horizontal line or plane.

It will be seen that in any event a suitable fire-grate and ash-chamber immediately below are required and that the same are combined with the said fire-chamber, and the whole thus arranged are suspended by suitable mechanical means within the front and upper corner or part of the oven *i* with a portion of said oven extending under the whole arrangement aforesaid.

At one side of such cooking-stove, and of course at and in one end of said fire-box or chamber *a*, I construct and arrange a suitable door, *b*, for the supply of fuel to said combustion-chamber. In said door, I construct and arrange the damper L, which is for the purpose of regulating the supply of atmospheric air required to start and to continue the combustion of the fuel in said fire-chamber. Said damper may be of any capacity required.

The front plate *e* of the said fire-chamber may be of any form or shape desired and arranged as near to

BEST AVAILABLE COPY the front plate, *d*, of the stove as may be deemed necessary in order to give sufficient capacity to the chamber or flue A′, which chamber, A′, is for the purpose of receiving, containing, and heating the air entering therein through the apertures *x′* in the front doors *k* and before it enters the oven *i*, for the purposes herein described and set forth.

The bottom plate *e*, below the said fire-box or chamber of combustion *a*, and the vertically-inclined plate *f* and the plate *g′* forming the under side of the flue *h*, leading from the said combustion-chamber *a* to the rear flues of the cooking-stove, constitute and form the upper portion, covering, or plate of the oven *i*.

The said plate *g′* is corrugated in the manner substantially as shown at *g′*, fig. 3, sheet 2, of the accompanying drawings, and marked fig. 3′. It is so corrugated for the purpose of giving more or greater surface for heating or baking purposes in the oven below when heated by the passage over the same of the heat or escaping heated products of combustion, or by said corrugations a suitable amount of ashes may be retained upon the said plate, so as thereby to retain within the oven below for a much greater length of time, such heat as may have been thrown therein by other means and plates, and which corrugations in either case are of great utility.

Along the front part of the said plate *g′* and at or near the plate *f* of said fig. 3′, I construct apertures of sufficient size and number to allow of a good and sufficient ventilation of said oven, while at same time the heated air escaping from said oven through such apertures will come into contact with the highly-heated escaping products of combustion passing from said fire-chamber over said corrugated plate, and such gases will thus and thereby become ignited and of course economize in the use of fuel in said stove and at the same time aid in a proper ventilation of said oven, as aforesaid stated.

The said plate *e* not only forms proper covering for that part of the oven that extends under the said fire-chamber *a*, but it also forms the lower plate of the ash-pit or chamber H between said plate and said fire-grate and through which plate passes the heat reflected from the fire upon said fire-grate, and thus contributing somewhat toward baking purposes.

The said oven, *i*, has a door or doors, *j*, upon each side thereof, of suitable size, and properly attached to the stove-plate in the usual way by means of hinges, and the same are for access to said oven.

The said oven, unlike any other cooking-stove, has an opening in the front thereof, for the purpose of using therewith one or two or more doors, if found expedient to use more than two such doors.

*k* represents such front doors, in the front end of the said oven, as well as in the front of said stove, and it or they may extend upward to or nearly to the top of the fire-chamber or chamber of combustion, or it or they may extend up no farther than to the under side of the said ash-chamber, or to the said fire-grate within said fire-chamber or chamber of combustion *a*, as the case may be, or require, for, and because this part of my said invention and improvements in such case would be the same in principle and operation.

When such doors are thrown wide open, and a tin or other suitable roaster is placed in front of the said oven (thus opened into) on the apron *l*, the heat radiated by the several plates into the oven *i*, as aforesaid, will roast or bake such things as may be placed into such roaster for that purpose, while at the same time the said heat will be retained in the said oven, so that the process of baking may at the same time be therein going on.

The said roaster, for the time being, closes up the said opening or aperture in said front part of such stove, and produced by the throwing wide open or removing of the said doors or door, *k*.

When said roaster is removed therefrom, there being no longer further present use of the same, in the manner substantially as aforesaid, then said door or doors, *k*, are closed, in order to close up such aperture or opening made as aforesaid.

The said roaster may be of any suitable material, and of any form or shape desirable. It must, however, be of sufficient size to receive the open space caused by the opening of said door or doors, as the case may be, and it may be securely fastened in front of said open space to the main part of the stove, in any convenient manner, for and during the use required thereof, so that the radiation or radiated heat from the said front plate of said fire-box or chamber, *a*, or from said fire-chamber itself, may be used for the purpose of roasting or cooking such things as may be placed thereon for that purpose.

The said roaster is portable, and therefore may be attached to or detached from the said front of the cooking-stove, at the pleasure of the operator. This is most convenient, as well as quite useful, as will be found upon a trial or use of such roaster, so arranged and combined, to and with a cooking-stove.

The said front door or doors, opening from the said oven, and from in the front of the said suspended fire-chamber, fire-grate, and ash-pit or chamber, will also be found convenient and useful in the warming of the room, when said stove may be used in very cold weather, as well as convenient in the management of things within said oven, which are there being baked or roasted.

It may sometimes be deemed best or expedient to put a plate, extending from the front plate of the fire-box and ash-chamber downward to the bottom plate of the oven, containing suitable openings, or it might have or contain a damper, or more than one damper at or near the bottom edge of such plate, or near to the bottom of the said oven, which shall open from said front doors into said oven, and such plate may be detachable and removable, or it may be made stationary in such position, if deemed best so to do, as the damper or dampers, or openings aforesaid within such plate, would admit of the passage and entrance of the air, which should have been heated by coming into contact with the front plate of said fire-chamber as it enters through the apertures *x′*, in the manner herein set forth, into the said oven, *i*, for the purpose of aiding in the baking process, substantially as herein set forth and described.

The invention and improvements, so far as relates to that part or branch, would be substantially the same in principle and operation, there being only a mechanical change or variation in the construction, without changing in anywise the real and material invention and improvements.

In case there be used such additional plate containing such damper or dampers, or openings, it would, as a matter of course, be arranged at a small distance from said door or doors in the front of said stove, thus and thereby forming a sort of space or chamber between it and such doors, and extending upward to that chamber, between said front fire-chamber plate and the upper portion of said front doors, and which is herein described and set forth.

The upper edge of such additional plate, which is represented by dotted lines at R, fig. 3, sheet 2, of accompanying drawings, would, of course, connect with the lower part, edge, or portion of said fire-chamber, as seen at said fig. 3, and extend entirely across the front part of said oven. If it contained a damper or dampers, as aforesaid, they would remain open, more or less, while and during the process of baking or roasting in said oven, and would remain closed when and while such front doors are thrown wide open, so as to aid in the throwing of heat into the room from said plates of said fire-chamber, in order to warm the same, as and in the manner aforesaid.

The top flue *h* extends from the upper part or portion of the fire-chamber *a* over and upon said top-plate, *g'*, of the oven *i*, and to the vertical flue or flues in the rear end of the stove. In or near the central part thereof it opens into an exit-flue, *m*, or chamber, underneath the reservoir or water-tank *c'*, all of which is described and set forth in detail in another specification, in another division of the invention, of even date herewith.

The passage of heat into said chamber *m* from said flue *h* is through an opening or aperture governed by a damper, *n*, which is opened to kindle or start the fire, or when it is not desired to heat the oven for baking purposes; but when closed, the top-flue discharges into one or more diving-flues, *a*, at and arranged in a vertical position within the rear end of the stove, and which flue or flues discharge into corresponding ones in the bottom of the stove, and just below and in proximity to the bottom-plate T of the oven *i*, represented at *p* of the accompanying drawings, and passing the heat or the escaping heated products of combustion along such flues to the front end of the same, the same is discharged into one or more return-flues, *q*, placed between such other flues as aforesaid, and passing back to the said vertical flue or flues *m'*, and known as ascending between the diving or descending ones, described as aforesaid, and which open and discharge into said chamber underneath said reservoir, as aforesaid; thence into the direct exit or chimney-pipe or flue-tube.

The back and bottom of said flues are made by the oven-plates and back-plates, *s*, and bottom-plate. *t*. of the stove, with suitable partition-plates, substantially as shown in the accompanying drawings.

The said vertical flues, and flues within the bottom of said stove, are each and every enclosed within and by the means of a covering or encasement, made of tin or other sheet or suitable metal, placed at a proper distance from the cast-iron plate of the bottom or of the end, and that covering or encasing the vertical end-flues is represented by *u*, and that of the bottom of the stove by *v*, of the accompanying drawings. I denominate the said coverings or encasements, respectively, as extra back and extra bottom. The space or chamber between said extra back and extra bottom may be of any capacity deemed best, and they may each be fastened to their respective parts of said stove by any convenient and effective mechanical means, and may be so constructed and arranged as to be detachable and removable from the said stove whenever it is desirable to prevent the heat from being radiated into the room, and to retain the same in and within the said back and bottom cast-iron plates, as well as within the flues of the stove, for baking, roasting, or other purposes, then I use said extra-back and extra-bottom coverings or encasements, which are very useful and desirable for use in the warm weather, or summer-time of the year, as the same will, of course, prevent the escape of such heat from the stove through said cast-iron plates and into the room when the stove is being used.

I prefer to make such encasements or coverings out of tin, as the same is more effective in retaining the heat, in the manner aforesaid, but other sheet metal may answer the purposes required aforesaid.

The said back encasement *u* is so constructed as that the edges thereof shall closely fit to the surface of the stove, and with a flange at the top, which enters under the cleat *w* on the under surface of the bottom-plate of the exit-flue chamber *m*, fig. 3, and is then firmly held by the pin *y*, or any other means or device which will answer the purpose required may, of course, be used.

The said extra bottom or encasement, *v*, has a rim around the entire upper edge, which fits up and against the bottom plate of the stove, so that there shall be no escape of the heat within the chamber formed between said iron stove-plate of the bottom and the said encasement, and the same time firmly securing such extra bottom in and to its proper place by bolts or pins passing through the edges of the staples on the bottom plate of the stove, or any other sufficient and suitable mechanical means which will answer the purposes desired may be used.

Figure 2:
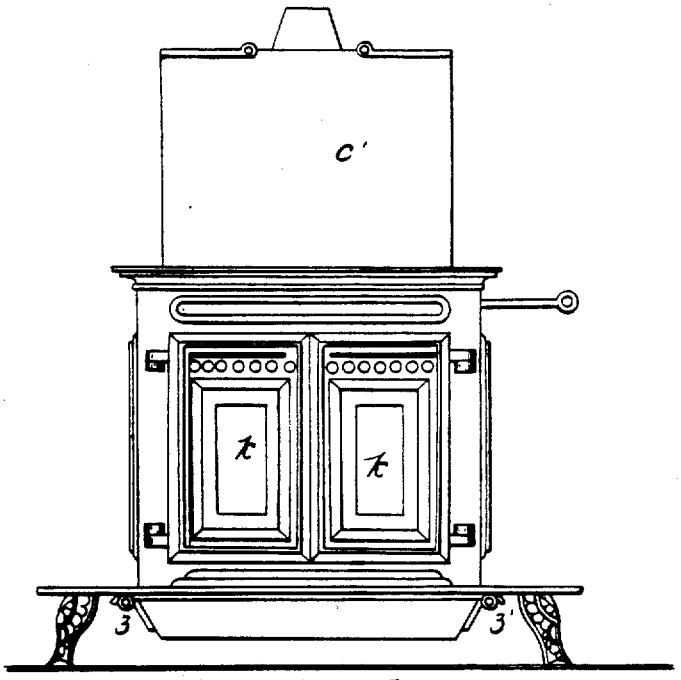
Figure 2 represents a front elevation, showing the front doors opening into the oven and containing the apertures therein contained, and each and all hereinafter more fully described and set forth.

*z* is a lip or hasp on each side of the stove, which fits one end upon the staple *z'*, figs. 2 and 7, made to correspond thereto, and through which staple passes a suitable pin after the said hasp has been placed thereon, for the purpose of securing the said extra bottom to the stove, substantially as aforesaid.

There may be more than one such hasp and staple, with pin arranged therewith, upon either side of said extra bottom. So may the respective ends thereof be fastened or secured to such stove, if deemed necessary so to do.

As I have hereinbefore stated there may be, there is an air-space or chamber between the said extra bottom and extra back plate and the respective bottom plate and end vertical end-plate of the stove, so that the air within such space or chamber so constructed and arranged as aforesaid, shall act as a non-conductor, and thus aid in the preventing of the radiation of the heat into the room where the stove may be used, and thereby retain the heat much longer in the oven for baking, roasting, or cooking purposes in the oven and upon other parts of such cooking-stove, by means of which there will of course be a very great economy in the use of fuel at all seasons of the year.

It will now be seen that the employment and arrangement, as aforesaid, of said extra back and of said extra bottom parts or encasements, have a twofold purpose, to wit, first, to prevent the radiation of heat into the room where such stove is being used, which is very desirable, especially so during the summer months, and second, to retain the heat in the stove and oven, whereby roasting, baking, or cooking is carried on in the most perfect manner with great economy in the use of fuel.

The doors of the oven I also line with tin in the sheet, which I fasten to each respective door in any substantial manner by suitable mechanical means, which lining is for the purpose of preventing the escape of the heat within the oven by radiation or passing through the cast-iron doors. There may or may not be a space or chamber between such linings and such cast-iron doors of the oven, for in either case the said linings will contribute largely to retain the heat aforesaid.

The top plate B of the stove extends back over the exit-flue space or chamber *m*, and besides the usual boiler-holes, it has a large hole, *b'*, to receive a large boiler or reservoir, (to contain water,) *c'*, which has two flues, *d' d'*, which pass through the bottom, one near each side thereof, and they run upward obliquely through and to the top of said boiler or reservoir, where they unite in one, substantially as seen, *e'*, in order to connect with the usual stove exit-pipe or chimney, in the manner substantially as shown at fig. 5 of the accompanying drawings. As the heated products of combustion enter the flue-space or chamber *m* from the middle back, they must spread outward in such chamber, and act under and against the bottom part of said boiler, in order to get to the two flues *d' d'* in the bottom of such reservoir, through which they ascend to the pipe upon the top plate of said reservoir. The said boiler or reservoir *c'*, as shown by the drawings herewith, has a removable or hinged cover, thus allowing easy access to and into the interior thereof, for the supply or removing of its contents, and also for the making of such boiler closed or tight, as occasion or use may require. The said cover being thus hinged, it is manifest that the water or condensed steam which may have gathered upon the under side thereof by means of the heating of the water therein, will drip from such under side of such cover where the same is turned upward, into the said reservoir or boiler *c'*, and of course prevent the same from dripping upon the floor of the room where such stove is used. But by such arrangement of the hinged cover, with its lower edge hanging directly over the opening of such boiler or reservoir, the water accumulating upon the under side thereof in any manner whatever, is returned to the water in said reservoir, when and after said cover is opened by and upon the hinge or hinges, substantially as aforesaid. Such cover may be of course constructed in one or more parts, each of which will be hinged substantially as aforesaid, which of course is not only convenient, but very useful.

The heated products of combustion not only act efficiently against the entire bottom of said reservoir, but upon the inside thereof, through the aforesaid inclined flues, which have their heating-surface increased by being thus arranged upon an inclined line or position, so as to form the single connection with the chimney exit-pipe, in the manner substantially as aforesaid, which inclined tubes may be of any capacity or shape deemed best for the purposes aforesaid.

The front plate *c* of the fire-box or chamber of combustion may be smooth and of an even surface, or it may be corrugated, as shown at *c*, fig. 7 of the accompanying drawings. It may be constructed upon a straight line from the bottom edge to the top edge thereof, as shown at said fig. 7; or, if deemed best, it may have any other suitable and required or desired form across the said width of the same. The said plate *c* extends entirely the full width of said oven or stove, and, of course the full length of said fire-chamber or combustion-chamber *a*, as it forms one side plate thereof, as aforesaid.

Between the said plate *c* and the front plate *d* of the stove, above the front doors *k*, or by means of said doors themselves, is located a hot-air flue or chamber, A, fig. 3, and hereinbefore mentioned and described. The said flue or chamber A extends entirely across the stove, and is of any capacity desired, and thereafter opens at the bottom or lower part thereof, directly into the front part of the said oven *i*, at or near the bottom plate *e* of the ash-pit or ash-chamber, or at the lower part of the fire-box or chamber of combustion, as the case may be.

The atmospheric air enters the said chamber through apertures *x'*, figs. 2 and 7, and coming into contact with the said plate in front of and forming said fire-box, as aforesaid, is heated within said chamber-bottom, such plate, and such front doors as it passes downward the same, to the bottom thereof, to wit, the chamber A and A', where, and at such lower part, said air, in a highly-heated state or condition, enters the said oven *i*, through which oven such heated air passes to and out in and through suitable openings or apertures, as shown at *y'*, fig. 8, and which are in the back plate in the back part or back end of said oven. Such apertures may be of any size, shape, or number, at any desired place or point sufficient for the purpose of ventilation and baking purposes.

It is quite manifest that apertures for the purpose of ventilation, as aforesaid, might be arranged in and through the other plates of said oven, at such points therein as will allow the escape to be had into a flue passing some part or portion of the oven. In this manner or substantially so, the oven is supplied by and with a fresh and continuous current of heated air, that shall not only contribute largely in the process of baking or roasting, but at the same time cause the said oven to be thoroughly ventilated of any and all foul or unwholesome matter that may arise by reason of baking, roasting, or cooking in and about said oven *i*, a thing thus accomplished and of great importance in the use of such oven, as aforesaid.

The capacity of the apertures *x'* should always be greater than that of the said apertures *y'*, so as to always maintain sufficient heat in the oven for any purpose that may be required, while at the same time said oven is sufficiently ventilated, and the continued current of fresh heated atmospheric air is always sufficiently hot to aid in the process of baking, roasting, or other cooking within said oven, substantially as aforesaid.

If desirable, the said oven front doors *k* may not extend upward as high as shown in the accompanying drawings, but may extend no farther upward than to the lower part of the ash-pit or ash-chamber, in which case the front plate *d* will extend, and continue downward far enough to meet the upper end of the said front doors

*k*, which would of course open into said oven, and would cover all that space or part of said oven *i* which extends forward under the said fire-chamber, fire-grate, and ash-chamber, aforesaid, producing the same effect and same results as would be the case when such doors continue upward, in the manner as hereinbefore described and set forth. In case of the short doors, as aforesaid, shall be constructed and used, then the said apertures *x'* would be made through the said plate *d*, instead of through the said doors *k*, as hereinbefore set forth.

The principle and the operation would be the same in either case should such apertures *x'* be made at or near the lower part of the said hot-air chamber, A A'. Then would there be required a partition-plate in said chamber, extending the whole length of said chamber, and upward from the bottom far enough to cause the air to pass upward and over the top of the same, and against and down the said plate of said fire-box or chamber-plate, *c*, figs. 3 and 7, and thence into the said oven, substantially as and for the purposes aforesaid. The said hot-air flue or chamber, A', may be of any capacity desired, and at the same time carry out the design or object of the same; and in case a plate is constructed and used in the front part of said oven, *i*, which shall commence upon the bottom plate of the oven, and be carried up to the lower part or corner of said fire-box, or ash-pit, or chamber, with damper or dampers therein, and shown at W, fig. 3, in the manner substantially as herein described; then the purposes, the working, and the operation of and in said chamber, A A', will be the same. The heated air would pass downward in such case to said damper or dampers, and through and by means thereof enter said oven for the purposes aforesaid, substantially as herein described and set forth. It will now be seen that the said chamber A A' answers a two-fold purpose, as follows, to wit: First, the air entering therein is highly heated, so as to facilitate baking in the said oven, in the manner as aforesaid, described and set forth; and, second, the cold air entering therein comes into contact with the front plate *c*, and thereby prevents the two rapid heating, and therefore burning out, of said plate, and while descending the said plate, becomes heated sufficient for baking purposes when it shall have entered the oven *i*, in the manner substantially as aforesaid.

The front part of the said oven opens directly into the said roaster supported upon the hearth and in front of said stove, in the manner substantially as herein contained. The said front doors *h*, being thrown wide open for the purpose of permitting the heat to pass into such roaster from said oven, as herein specified, the operation or process of roasting or baking therein, to wit, in said roaster, or additional, detachable and removable oven, goes on in a most perfect and satisfactory manner. When the said front doors are open, and no roaster or additional oven is placed thereon and therein as aforesaid, a large amount of heat is radiated or thrown into the room where such stove is used, from said oven, and from said fire-chamber suspended in the front part of said oven, as aforesaid, which, in cold or winter weather is quite desirable—especially so when the oven is not in use for baking or roasting purposes.

At Y, figs. 1, 2 and 3, also fig. 7, is a damper, which opens into the flue or flues immediately under the bottom plate of the oven of the cooking-stove. The said damper may be of any size, shape, or capacity required for the purposes intended. The damper-opening may be seen at Y, fig. 3, where it is shown to be in and through the top plate of the hearth in part, and in part in that part of the front plate of the stove which is immediately below the said front doors *k*. It, however, may be either in the plate alone, or in both, as there shown, so long as it opens into said flue or flues below and underneath said oven *i*. The said opening is covered with a suitable and corresponding piece of cast iron, which I denominate a front hearth-damper or valve, Y, and which is for the purpose of checking and aiding in the controlling of the circuit or circuitous draught of the heat when thrown on by means of the damper *n*, figs. 3 and 4, which cuts off the direct draught by pushing the same inwards by means of the rod attached thereto, and extending outwards from the stove, as shown at figs. 2, 4 and 7, for it closes the direct exit-flue space *o*, and directs the heat and escaping products of combustion into and down the flue or flues leading to the flue or flues in the bottom of the stove, and directly underneath the bottom plate of the oven. By partially opening or removing said damper Y from its place in the hearth or front part of the stove, the draught aforesaid will be controlled as desired by the person using the stove. So also may the ashes, soot, or other matter within the flue or flues in the bottom of the stove and underneath the oven be removed therefrom through such damper-opening, by some suitable instrument or tools constructed for that purpose.

The matter pertaining to the boiler or reservoir *e'*, as well as the warming-closet underneath such reservoir, and each and every part of the said cooking-stove in anywise connected thereto and therewith as a part thereof, in order to carry out the invention and improvements thereof, have been and are described and set forth in a specification of even date herewith, and which may be known as the second division of the reissue of the patent hereinbefore set forth, and, of course, the same need not be described in detail and at large in this specification of the reissue, division the first.

Having thus described the nature, construction, and operation of the invention and improvements contained in the claims hereto, now, therefore, what I claim, and desire to secure by the Letters Patent of the United States of America, is—

1. The supplying of a continued current of atmospheric air, heated by the front plate of the fire-box or chamber of combustion, and in a flue, chamber, or space immediately in front of the same, and in combination therewith, without the aid of any intervening plate or plates, to the oven of a cooking-stove, in which the oven is in the rear of the fire-chamber, and, at the same time, extending under and beyond it, so as to include the said flue, chamber, or space, at the lower part thereof, and thus and thereby permit the said heated air to enter the said oven, in the manner and for the purposes substantially as herein described and set forth.

2. I also claim the flue-space or intervening chamber A A', immediately in the front of the fire-box or chamber of combustion, with a fire-grate and ash-pit or chamber combined therewith, and the whole arranged and suspended in the front and upper corner or part of the oven *i*, into which space or intermediate chamber atmospheric air is admitted through apertures *x'*, or any equivalent thereof and therefor, and which are and shall be in and through the plate or door or doors in the front part of the cooking-stove, and in combination with the oven of such stove, so that the air heated within such intermediate chamber, substantially as herein set forth, may or shall be conducted to and into the oven, for the purposes and by the means substantially as herein described and set forth.

3. I also claim, in a stove constructed with an oven, and with a fire-box or chamber of combustion, having a fire-grate therein, and an ash-pit or chamber below, and all combined therewith, substantially like the one hereinabove described and set forth, the making of the front plate of the stove to open with a door or doors, *k*, and the attaching an apron in the front of the stove, so as to receive and contain a kitchen or other suitable roaster, substantially as specified herein, so that the heat radiated by the front plate of the fire-box or combustion-chamber shall be aided by the heat radiated by oven-plates therein, in the manner and for the purposes substantially as herein described and set forth.

4. I also claim the employment and arrangement of the front doors *k*, constructed with apertures, *x'*, or any equivalent thereof and therefor, therein, in combination with the fire-box or chamber of combustion *a*, by means of which atmospheric air, in a highly-heated condition, is admitted to the oven of a cooking-stove, for the purposes substantially as herein described and set forth.

5. I claim the employment and arrangement of a door or doors, *k*, or any equivalent thereof and therefor, so that the same, or a part thereof, shall open (in the front of the cooking-stove) in front of the fire-box or chamber of combustion, in combination with a fire-chamber or chamber of combustion, having a fire-grate therein, and ash-pit or chamber combined therewith, and arranged and suspended in the front part of the oven of a cooking-stove, in the manner and for the purposes substantially as herein described and set forth.

6. I claim the arrangement of a fire-chamber or chamber of combustion with a fire-grate and an ash-pit or ash-chamber combined therewith, and the whole suspended in the front part and upper corner of the oven of a cooking-stove, in the manner and by the means substantially as herein described and set forth.

7. I also claim the employment and arrangement of the additional or extra bottom and encasement *v*, in combination with the flues of the bottom of a cooking-stove, and immediately underneath the oven *i*, and with the space or chamber between the same and the bottom plate of the stove, in the manner and for the purposes substantially as herein described and set forth.

8. I also claim the employment and arrangement of the additional or extra back and encasement *u*, in combination with the ascending and descending flues in the rear end of a cooking-stove, and between the rear end of the oven and the rear vertical end-plate of the stove, in the manner and for the purposes substantially as herein described and set forth.

9. I also claim the employment of a corrugated plate, perforated along the front thereof, for the top of the oven *i*, as arranged in connection with the flue *h*, and fire-chamber, or chamber of combustion, and with the rear and vertical plate of the oven of a cooking-stove, substantially as and for the purposes herein described and set forth.

10. I also claim the employment and arrangement of the front damper or valve Y, in the front and hearth of a cooking-stove, in combination with the flue or flues, as the case may be, immediately underneath the oven and bottom plate of the oven of a cooking-stove, in the manner and for the purposes substantially as herein described and set forth.

11. I also claim the employment and arrangement of the damper *n*, or any equivalent thereof, and so combined with the flues of a cooking-stove, having a boiler or reservoir supported outside and back of the rear vertical end of a cooking-stove, and over a heating chamber or flue, so that the direct action of the heat upon such boiler or reservoir may be thrown or shut off, and the same caused to pass through the parts and flues of said cooking-stove, before entering such chamber immediately underneath such boiler or reservoir, and acting thereon, for the purpose of warming or heating the water therein, in the manner substantially as herein described and set forth.

12. I also claim the employment and arrangement of the boiler or reservoir, having a removable or detachable cone or top, and containing two inclined flues or tubes, which are separate at the bottom or lower end thereof, from each other, and which unite at the top or upper end thereof, and thus and then form but one pipe, in the manner and for the purposes substantially as herein described and set forth.

In testimony whereof, I have, on this 1st day of January, 1868, hereto affixed my name, in the presence of two witnesses, to wit:

PHILO P. STEWART.

Witnesses:

MARCUS P. NORTON,

CHARLES D. KELLUM.